(12) United States Patent
Tasaki et al.

(10) Patent No.: US 7,931,967 B2
(45) Date of Patent: Apr. 26, 2011

(54) THERMALLY FOAMABLE MICROSPHERE AND PRODUCTION PROCESS THEREOF

(75) Inventors: Yasuhiro Tasaki, Fukushima (JP); Genzo Asai, Fukushima (JP); Yoshikatsu Satake, Fukushima (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 10/480,207

(22) PCT Filed: Jun. 10, 2002

(86) PCT No.: PCT/JP02/05737
§ 371 (c)(1),
(2), (4) Date: Dec. 10, 2003

(87) PCT Pub. No.: WO02/100971
PCT Pub. Date: Dec. 19, 2002

(65) Prior Publication Data
US 2004/0157057 A1    Aug. 12, 2004

(30) Foreign Application Priority Data
Jun. 11, 2001    (JP) ................................ 2001-174946

(51) Int. Cl.
*B32B 5/16*    (2006.01)
*C08K 9/10*    (2006.01)
*C08K 9/06*    (2006.01)
*B01J 13/02*    (2006.01)

(52) U.S. Cl. ................ 428/402.2; 428/402.21; 428/403; 428/405; 264/4; 523/210; 523/212

(58) Field of Classification Search ............. 428/402.21, 428/402.22, 405, 403; 521/56; 264/4.1; 523/210, 212
See application file for complete search history.

(56) References Cited

U.S. PATENT DOCUMENTS

| | | | |
|---|---|---|---|
| 3,142,583 A * | 7/1964 | McMahon et al. | 428/560 |
| 3,615,972 A * | 10/1971 | Morehouse et al. | 156/79 |
| 3,740,359 A * | 6/1973 | Garner | 521/57 |
| 4,582,756 A | 4/1986 | Niinuma et al. | |
| 5,461,125 A * | 10/1995 | Lu et al. | 525/293 |
| 5,834,526 A | 11/1998 | Wu et al. | |
| 6,613,810 B1 | 9/2003 | Ejiri et al. | |
| 2003/0114546 A1 | 6/2003 | Satake et al. | |
| 2003/0143399 A1 | 7/2003 | Satake et al. | |
| 2005/0079352 A1 * | 4/2005 | Glorioso et al. | 428/402.21 |

FOREIGN PATENT DOCUMENTS

| | | | |
|---|---|---|---|
| DE | 198 10 803 A1 * | 9/1999 | |
| EP | 1288272 | 5/2003 | |
| GB | 1044680 | 5/1966 | |
| GB | 2081720 | 2/2002 | |
| JP | 57051729 | 3/1982 | |
| JP | 59-038241 | 3/1984 | |
| JP | 62-286534 | 12/1987 | |
| JP | 04-202443 | 7/1992 | |
| JP | 04-320432 | 11/1992 | |
| JP | 05-125223 | 5/1993 | |
| JP | 06-240040 | 8/1994 | |
| JP | 10-176078 | 6/1998 | |
| JP | 10176078 A * | 6/1998 | |
| JP | 11-181210 | 7/1999 | |
| JP | 11-209504 | 8/1999 | |
| JP | 11-335509 | 12/1999 | |
| JP | 2000086937 | 3/2000 | |
| WO | WO0183636 | 11/2001 | |

* cited by examiner

*Primary Examiner* — James Seidleck
*Assistant Examiner* — Saira Haider
(74) *Attorney, Agent, or Firm* — Porter Wright Morris & Arthur LLP

(57) ABSTRACT

The invention provides a thermally foamable microsphere having a structure with a foaming agent encapsulated in a shell formed of a polymer, wherein the shell contains an organosilicon compound, and a process for producing a thermally foamable microsphere having a structure with a foaming agent encapsulated in a shell formed of a polymer by suspension polymerization of a polymerizable mixture containing at least a foaming agent and a polymerizable monomer in an aqueous dispersion medium, wherein the polymerizable mixture is suspension polymerized in the presence of the organosilicon compound.

5 Claims, No Drawings

THERMALLY FOAMABLE MICROSPHERE AND PRODUCTION PROCESS THEREOF

RELATED APPLICATION

The present application is a 371 of PCT/JP02/05737 filed Jun. 10, 2002.

TECHNICAL FIELD

The present invention relates generally to a thermally foamable microsphere having a structure wherein a foaming agent is encapsulated in a shell formed of a polymer, and more specifically to a thermally foamable microsphere having outstandingly improved adhesion to other materials such as inorganic and/or organic materials, and its production process. The thermally foamable microspheres of the invention may be applied to a wide range of industrial fields inclusive of paints and inks.

BACKGROUND ART

Thermally foamable microspheres, also called thermally expansible microcapsules, are now put into practical use in various fields, for instance, in the form of fillers for paints or plastics added for weight-reduction purposes, let alone foaming inks. Thermally foamable microspheres have usually volatile liquid foaming agents microcapsulated with polymers. Generally, the thermally foamable microspheres may be produced by the suspension polymerization in an aqueous medium of a polymerizable mixture that contains at least a foaming agent and a polymerizable monomer. As the polymerization reaction goes on, a shell is formed by the resulting polymer, yielding a thermally foamable microsphere having a structure wherein the foaming agent is wrapped up and encapsulated in the shell.

As applications of thermally foamable microspheres spread and their performance demanded in individual applications becomes high, the level of performance demanded for them are going up.

One of the current requirements for thermally foamable microspheres is that on and after foaming by heating, there be little or no agglomeration due to fusion among foamed particles. Another requirement for these microspheres is that they exhibit sharp foaming start behavior even upon subject to thermal hysteresis at high temperatures on drying, etc.

Thermally foamable microspheres are not only incorporated in inks, paints, plastics, etc. while they remain unfoamed but are also sometimes used in foamed states. Foamed particles, because of being hollow plastic balloons, are so much reduced in weight that they can be used as a filler material for paints as an example, thereby reducing the weight of the application member to be coated. However, agglomeration among foamed particles would make mixing with substrate materials for paints, etc. difficult and, at worst, cause destruction of the foamed particles during mixing.

One possible approach to prevention of agglomeration among foamed particles is to cover unfoamed thermally foamable microspheres with inorganic fine particles. However, it is very difficult to adhere the inorganic fine particles uniformly to the surface of a thermally foamable microsphere and place the amount of adherence under strict control. A failure in the uniform adherence of the inorganic fine particles to the surface of the thermally foamable microsphere would render uniform mixing difficult. Too little inorganic fine particles would make sufficient prevention of fusion upon foaming by heating impossible. Too much would render sufficient foaming difficult and, at worst, impossible.

Yet another requirement for thermally foamable microspheres is to ensure sharp foaming thereby yielding foamed particles of uniform shape and size. To this end, selection of polymerizable monomers and improvements in suspension polymerization conditions are now proposed (e.g., JP-A 11-209504). Only by means of adherence of inorganic fine particles to the surface of a thermally foamable microsphere, however, it is still difficult to gain control of foamability, and so it is impossible to achieve such good properties.

For the production of thermally foamable microspheres by suspension polymerization in an aqueous dispersion medium, it is known that use of an aqueous dispersion medium containing colloidal silica or other inorganic fine particles as a dispersion stabilizer permits the inorganic fine particles to adhere to the surfaces of the resulting thermally foamable microspheres. Because of a weak force of adherence of the inorganic fine particles to the thermally foamable microspheres, however, the inorganic fine particles in an amount enough to prevent fusion among foamed particles cannot adhere uniformly and firmly to the surfaces of the thermally foamable microspheres. In this case, when the reaction mixture is filtered and washed in a recovery step after the completion of polymerization, nearly all of the inorganic fine particles used as the dispersion stabilizer will remain contained in filtrates.

Even though the inorganic fine particles adhere to the surfaces of thermally foamable microspheres, they will be readily released off in washing and subsequent steps, and it is difficult to gain strict control of the amount of adherence of the inorganic fine particles. In addition, use of colloidal silica or the like as the dispersion stabilizer causes filtrates to become cloudy. The cloudy filtrates cannot be disposed without charging a flocculant therein for sedimentation, followed by centrifugal removal of cloudy matter. Release of the inorganic fine particles off the surfaces of the thermally formable microspheres in the subsequent treatment steps will cause dusting that may otherwise render working environments worse.

By increasing the amount of the dispersion stabilizer such as colloidal silica, it is possible to increase the amount of adherence of inorganic fine particles to the surfaces of thermally foamable micro-spheres. However, clouding problems with filtrates and problems due to the release of inorganic fine particles in the washing and subsequent steps remain still unsolved. In addition, the thus increased amount of adherence of inorganic fine particles to the surfaces of thermally foamable microspheres incurs another problem that the average particle diameter of the obtained thermally foamable microspheres becomes small whereas the particle diameter distribution thereof becomes wide.

On the other hand, there is a growing demand for thermally foamable microspheres exhibiting sharp foaming start behavior. In some cases, thermally foamable microspheres are dispersed in an aqueous dispersion medium such as an aqueous emulsion for use depending on applications. Using a coater or the like, an aqueous dispersion containing thermally foamable microspheres is coated on a primer material, and then dried and foamed by heating. Often in this case, drying is carried out by means of the spraying of hot air at elevated temperature for the purpose of cutting off the drying time. Upon subject to thermal hysteresis at high temperature during drying, some portions of conventional thermally foamable microspheres are foamed even at temperatures lower than the foaming temperature and, consequently, they exhibit generally broad foaming behavior. This in turn causes damage to the surface properties and smoothness of a foamed particle layer, giving rise to problems on practical use.

Some publications (e.g., Japanese Patent Application No. 2000-131859 corresponding to JP-A 2002-12693 and WO 01/83636) propose that the foaming behavior of thermally foamable microspheres can be controlled by way of control of the modulus of elasticity of a shell resin with respect to temperature and control of the vapor pressure vs. temperature of a foaming agent encapsulated in the shell. Only with such a prior art, however, it is still difficult to obtain thermally foamable microspheres exhibiting sharp foaming behavior even via thermal hysteresis at high temperature during drying.

Thermally foamable microspheres having improved adhesion to other materials are also in demand. In most cases, thermally foamable microspheres are incorporated in substrate materials for inks, paints, plastics, etc. in unfoamed states, and then heated for foaming. However, when foamed particles are poor in adhesion to such substrate materials, various inconveniences are likely to occur in connection with appearances and physical properties. In this case, how to modify shells is of importance. If the adhesion of the shells of thermally foamable microspheres in general and the surface adhesion in particular are improved, adhesion to various substrate materials can then be improved.

Furthermore, if the adhesion of the shells of thermally foamable microspheres can be enhanced, it is then possible to provide uniform and firm adherence of inorganic fine particles thereto and gain strict control of the amount of adherence. This in turn will allow the foaming behavior of thermally foamable microspheres to be precisely controlled and designed. As a result, there will be provided new technical means for preparing hybrid hollow microspheres or functional additives comprising resin particles coated with inorganic fine particles. However, never until now is anything proposed about technical means for improving the adhesion of shells of thermally foamable microspheres.

DISCLOSURE OF THE INVENTION

One object of the invention is to provide a thermally foamable microsphere having improved adhesion to other materials, and its production process.

Another object of the invention is to provide a thermally foamable microsphere capable of reducing fusion among foamed particles, and its production process.

Yet another object of the invention is to provide a thermally foamable microsphere exhibiting very sharp foaming start behavior even upon subject to thermal hysteresis at high temperatures during drying or the like, and its production process.

A further object of the invention is to provide a thermally foamable microsphere capable of bonding at its surface firmly to other material so that hybrid hollow microspheres or functional additives can be prepared, and its production process.

A further object of the invention is to provide a process for the production of a thermally foamable micro-sphere by suspension polymerization, wherein a cloudy waste liquid problem ascribable to inorganic fine particles used as a dispersion stabilizer is reduced or eliminated.

As a result of extensive and intensive studies made to achieve the aforesaid objects, the inventors have now found that thermally foamable microspheres having outstandingly improved adhesion to other materials can be obtained by incorporating an organosilicon compound such as a silane coupling agent in a shell formed of a polymer.

To incorporate the organosilicon compound in the polymer shell of a thermally foamable microsphere produced by the suspension polymerization of a polymerizable mixture, the polymerizable mixture should be suspension polymerized in the presence of the organosilicon compound. It is also effective to treat the surface of the thermally foamable microsphere obtained by the suspension polymerization with a silicon compound.

The thermally foamable microsphere with the shell containing the organosilicon compound can adhere at its surface firmly to inorganic fine particles, etc., and enables the amount of adherence to be strictly controlled. Thus, the thermally foamable microsphere with the organosilicon compound contained in the shell can prevent agglomeration of foamed particles due to fusion without detrimental to foaming properties.

When thermally foamable microspheres are produced by the suspension polymerization of a polymerizable mixture in an aqueous dispersion medium containing colloidal silica or other inorganic fine particles as a dispersion stabilizer, the inorganic fine particles can be uniformly and firmly adhered to the surface of the shell as designed. In addition, this process makes it possible to solve or reduce a cloudy waste liquid problem arising after suspension polymerization.

These findings have underlain the thus accomplished invention.

Thus, the present invention provides a thermally foamable microsphere having a structure with a foaming agent encapsulated in a shell formed of a polymer, characterized in that the shell formed of a polymer contains an organosilicon compound.

The present invention also provides a process for producing a thermally foamable microsphere having a structure with a foaming agent encapsulated in a shell formed of a polymer by the suspension polymerization in an aqueous dispersion medium of a polymerizable mixture containing at least a foaming agent and a polymerizable monomer, characterized in that the polymerizable mixture is suspension polymerized in the presence of an organosilicon compound.

Further, the present invention provides a process for producing a thermally foamable microsphere having a structure with a foaming agent encapsulated in a shell formed of a polymer by the suspension polymerization in an aqueous dispersion medium of a polymerizable mixture containing at least a foaming agent and a polymerizable monomer, characterized in that a thermally foamable microsphere recovered after the completion of a polymerization reaction is treated on a surface thereof with an organosilicon compound.

BEST MODE FOR CARRYING OUT THE INVENTION

1. Thermally Foamable Microsphere

In the thermally foamable microsphere of the invention having a structure wherein a foaming agent is encapsulated in a shell formed of a polymer, that shell contains an organosilicon compound therein. With a silane coupling agent used as the organosilicon compound, it is possible to adhere the organosilicon compound easily to the shell. With silane coupling agents containing a variety of functional groups, now available in the art, it is possible to provide easy chemical modification of the shell with various functional groups.

If the shell-forming polymer is copolymerized with a silane coupling agent containing a polymerizable functional group, it is then possible to form a shell with the organosilicon compound chemically bonded thereto. By working out some ways for suspension polymerization, it is also possible to form a thermally foamable microsphere wherein the organosilicon compound like the silane coupling agent is more distributed on the surface of the shell than the rest.

With the thermally foamable microsphere of the invention wherein the shell contains the organosilicon compound, other material can firmly adhere to the surface of the shell via this organosilicon compound. For instance, inorganic fine particles can adhere uniformly and firmly to the surface of the shell via the organosilicon compound with precise control of the amount of adherence. In the thermally foamable microspheres with inorganic fine particles adhering thereto, fusion among foamed particles can effectively be prevented. If the amount of adherence of inorganic fine particles is reduced, the adhesion of the thermally foamable microspheres to other material can be enhanced while aggromeration of the thermally foamable microspheres themselves can be avoided.

In the thermally foamable microspheres of the invention, the organosilicon compound should preferably be a silane coupling agent as already described, although a silane coupling agent containing a polymerizable functional group is most preferred. The reasons are that the silane coupling agent allows the microsphere to bond more firmly to other material, and any desired modification can be made with the introduction of various functional groups in the silane coupling agent.

Usually but not exclusively, the thermally foamable microspheres of the invention should an average particle diameter of 3 to 100 μm, and preferably 5 to 50 μm. The thermally foamable microsphere of the invention contains the foaming agent in an amount of usually 5 to 50% by weight, and preferably 7 to 35% by weight. The foaming agent used herein includes a low-boiling organic solvent and a compound that decomposes by heating to generate gases, among which the low-boiling organic solvent is preferred. More specifically, the foaming agent is selected from those placed into a gaseous state at a temperature lower than the softening point of the shell-forming polymer.

The shell of the thermally foamable microsphere of the invention is usually formed of a polymer excellent in gas barrier properties and heat resistance. Specifically, the shell may be formed using various polymerizable monomers such as acrylic acid ester, (meth)acrylonitrile, vinylidene chloride, vinyl chloride and styrene. Among others, vinylidene chloride copolymers and (meth)acrylonitrile copolymers are preferred for the purpose of maintaining a high degree of balance among gas barrier properties, solvent resistance, heat resistance, foamability, etc.

According to the invention, thermally foamable microspheres having a variety of foaming behaviors can be obtained by control of combinations and composition ratios of the polymerizable monomers used and a choice of the type of the foaming agent.

2. Thermally Foamable Microsphere Production Process

The thermally foamable microsphere of the invention can be produced by the process for producing a thermally foamable microsphere having a structure in which a foaming agent is encapsulated in a shell formed of a polymer obtained by the suspension polymerization in an aqueous dispersion medium of a polymerizable mixture that contains at least a foaming agent and a polymerizable monomer, wherein the polymerizable mixture is suspension polymerized in the presence of an organosilicon compound.

For the organosilicon compound, it is preferable to use an organosilicon compound having at least one polymerizable reactive group selected from the group consisting of a vinyl group, a methacryl group, an acryl group and an allyl group. Such a polymerizable organosilicon compound can be incorporated in the polymer that forms the shell of the thermally foamable microsphere while it is chemically firmly bonded to the polymer by way of copolymerization.

Specific processes for the suspension polymerization of the polymerizable mixture in the presence of the organosilicon compound involve (i) a process wherein the polymerizable mixture is suspension polymerized with the organosilicon compound added thereto, (ii) a process wherein the organosilicon compound is added in the course of polymerization to a polymerization reaction system containing an aqueous dispersion medium and the polymerizable mixture, followed by a further continued suspension polymerization, and (iii) a combined process of (i) and (ii).

Of these processes, preference is given to the process (ii) wherein the organosilicon compound is added in the course of polymerization to a polymerization reaction system containing an aqueous dispersion medium and the polymerizable mixture, followed by a further continued suspension polymerization. Preferably in this case, the pH of the polymerization reaction system at the starting and stopping points of polymerization as well as in the course of polymerization should be controlled at 7 or lower, especially 6 or lower, and more especially 5.5 or lower. Although depending on the type of the dispersion stabilizer used, no sufficient effect is often obtained as the pH of the polymerization reaction system exceeds 7.

There is another process for incorporating the organosilicon compound in the shell, wherein the surface of the thermally foamable microsphere obtained by suspension polymerization is treated with the organosilicon compound. This surface treatment may be carried out by generally available silane coupling filler treating processes such as dry processes, wet processes, spray processes, and integral blending processes.

The thermally foamable microsphere of the invention, wherein the polymer shell contains the organosilicon compound, allows other material such as an inorganic material and/or an organic material to adhere to the surface thereof, so that fusion among foamed particles can be avoided and the nature of the shell surface can be modified. Some inorganic materials are preferred because of being generally capable of reacting or interacting with an organic functional group or silanol group in the organosilicon compound.

Processes for allowing other material such as an inorganic material and/or an organic material to adhere to the shell involve (i) a process wherein at the start point it is added to a polymerization reaction system in the form of a dispersion stabilizer or the like when the thermally foamable microsphere is polymerized by suspension polymerization, (ii) a process wherein it is added to a polymerization reaction system in the course of a polymerization reaction, (iii) a process wherein it is added to a polymerization reaction system after the completion of a polymerization reaction, (iv) a process wherein it is blended with the obtained thermally foamable microsphere, and (v) a combined process thereof.

(1) Organosilicon Compound

The organosilicon compound used herein is understood to mean silicon compounds having an organic group, among which silane coupling agents are preferred. A typical silane coupling agent is an organosilicon compound represented by the following formula (1).

$$YSi(CH_3)_{3-n}X_n \qquad (1)$$

Here n is 1, 2 or 3.

In formula (1), Y stands for an organic or inorganic functional group, for instance, a vinyl group, a methacryl group, an acryl group, an allyl group, an epoxy group, an amino group, a mercapto group or chloro group, or a functional group containing these groups. Exemplary Y's include such functional groups as mentioned below.

Y: $CH_2=CH-$, $Cl(CH_2)_3-$, $H_2N(CH_2)_3-$,
$H_2N(CH_2)_2NH(CH_2)_3-$,

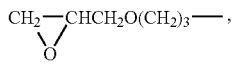

$CH_2=C(CH_3)COO(CH_2)_3-$,
$HS(CH_2)_3-$,
$Cl-$

In formula (1), X stands for a halogen atom such as a chlorine atom, —OR (R is a hydrogen atom or a lower alkyl group such as a methyl or ethyl group), and —NR$_2$ (R is a hydrogen atom or a lower alkyl group such as a methyl or ethyl group). In most cases, X is a hydrolysable group bonded to the silicon atom. Exemplary X's include such groups as mentioned below.

X: —Cl, OR (R: H, —CH$_3$, —C$_2$H$_5$)
—NR$_2$ (R: H, —CH$_3$, —C$_2$H$_5$)

Exemplary organosilicon compounds having a polymerizable reactive group include those containing a vinyl group, a methacryl group, an acryl group or an allyl group.

Specific examples of the preferred organosilicon compound are 3-methacryloxypropyltrimethoxysilane, 3-methacryloxypropylmethyldimethoxysilane, 3-methacryloxypropyltris(trimethylsiloxane)silane, vinyltrichlorosilane, vinyltrimethoxysilane, vinyltriethoxysilane, vinyl-tris(2-methoxyethoxy)silane, vinyl-tris(2-methoxyethoxy)silane, vinyltriacetoxysilane, vinyl-tris(2-trimethylsiloxy)silane, allyltrimethylsilane, 3-glycidoxypropyltrimethoxysilane, 3-glycidoxypropylmethyldimethoxysilane, 3-[N-allyl-N-(2-aminoethyl)]aminopropyltrimethoxysilane, 3-(N-allyl-N-glycidyl)aminopropyltrimetoxysilane, 3-(N-allyl-N-methacryloyl)aminopropylmethoxysilane, N,N-bis[3-(methyldimethoxysilyl)propyl]methacrylamide, N,N-bis[3-(trimethoxysilyl)propyl]methacryamide, 1-(3-methacryloxypropyl)-1,1,3,3,3-pentamethyldisiloxane and trimethoxysilylvinyl bicyclo[2,2,1]heptane.

Of these, particular preference is given to a silane coupling agent having a polymerizable reactive group, for instance, 3-methacryloxypropyltrimethoxysilane. These organosilicon compounds may be used alone or in combination of two or more.

The content of the organosilicon compound should be preferably at least 0.005% by weight, more preferably at least 0.01% by weight, and even more preferably at least 0.015% by weight on the basis of the total weight of the thermally foamable microsphere. As the content of the organosilicon compound is too small, the effect on improvements in the adhesion to other material becomes slender.

The upper limit to the content of the organosilicone compound should be preferably 5% by weight, and more preferably about 1% by weight; the content of the organosilicon compound should be more preferably 0.01 to 5% by weight, and even more preferably 0.015 to 1% by weight. Too much organosilicon compound saturates the effect on adhesion improvements and so not economical.

(2) Inorganic Material and/or Organic Material

The inorganic material used herein, for instance, includes fine powders of silica, calcium carbonate, talc, titanium oxide, glass, kaolin, clay, mica, nepheline syenite, synthetic silicic acid, quartz, fluorite, diatomaceous earth, barium sulfate, pumice stone and other inorganic pigments. The inorganic material also includes colloidal silica, and colloids of magnesium hydroxide, calcium phosphate, etc. These inorganic fine particles are preferred as the inorganic material.

For the organic material, on the other hand, it is preferable to use an organic material capable of reacting or interacting with the functional group or silanol group in the organosilicon compound. Exemplary organic materials are polymers having a functional or polar group. These organic materials should be used in a fine particle form.

These inorganic and/or organic materials may be used alone or in combination of two or more. Among these, preference is given to colloidal silica that can be used as a dispersion stabilizer.

Usually but not exclusively, the inorganic material and/or organic material(s) should have an average particle diameter far smaller than that of the thermally foamable microspheres, for instance, up to 10 μm, preferably up to 1 μm, and more preferably up to 0.1 μm.

The content (amount of adherence) of the inorganic material and/or organic material should be preferably 0.01 to 50% by weight, and more preferably 0.05 to 10% by weight on the basis of the total weight of the thermally foamable microsphere. When the content of the inorganic material and/or organic material is too small, it is often difficult to ensure that the shells of the thermally foamable microspheres have adhesion and other functions while agglomeration of the thermally foamable microspheres is avoided.

When fusion among foamed particles is prevented by adherence of the inorganic material and/or organic material, the content (amount of adherence) of the inorganic material and/or organic material is of the order of 1.5 to 15% by weight on the basis of the total weight of the thermally foamable microspheres. Too much inorganic material and/or organic material would make foaming difficult.

(3) Foaming Agent

The foaming agent used herein is usually a substance that gasifies at a temperature lower than the softening point of the shell-forming polymer. Preferable for such foaming agents are low-boiling organic solvents exemplified by low-molecular-weight hydrocarbons such as ethane, ethylene, propane, propene, n-butane, isobutane, butene, isobutene, n-pentane, isopentane, neopentane, 2,2,4-trimethylheptane, n-hexane, isohexane, petroleum ether and heptane; chlorofluorocarbons such as CCl$_3$F; and tetraalkylsilanes such as tetramethylsilane. These foaming agents may be used alone or in combination of two or more.

Preferable among them are isobutane, n-butane, n-pentane, isopentane, n-hexane, isohexane, heptane, 2,2,4-trimethylpentane and petroleum ether, which may be used in admixture of two or more. If desired, it is acceptable to make use of a compound that is thermally decomposed by heating into a gaseous state.

(4) Polymerizable Monomer

The polymerizable monomer used herein is exemplified by acrylic esters such as methyl acrylate, ethyl acrylate, butyl acrylate and dicyclopentenyl acrylate; methacrylic esters such as methyl methacrylate, ethyl methacrylate, butyl methacrylate and isobornyl methacrylate; and acrylonitrile, methacrylonitrile, vinylidene chloride, vinyl chloride, styrene, vinyl acetate, α-methylstyrene, chloroprene, neoprene and butadiene. These polymerizable monomers may be used singly or in combination of two or more.

Preferably in the thermally foamable microsphere, the polymer that forms the shell should be thermoplastic and have gas barrier properties. In consideration of these, vinylidene chloride (co)polymers and (meth) acrylonitrile (co)polymers are preferred for the shell-forming polymer.

The vinylidene chloride (co)polymers are exemplified by (co)polymers that are obtained using as a polymerizable monomer vinylidene chloride alone or a mixture of vinylidene chloride and a vinyl monomer copolymerizable therewith. The monomer copolymerizable with vinylidene chloride, for instance, includes acrylonitrile, meth-acrylonitrile, methacrylic ester, acrylic ester, styrene and vinyl acetate.

Preferable for one vinylidene chloride (co)polymer are copolymers that are obtained using as polymerizable monomers (A) 30 to 100% by weight of vinylidene chloride and (B) 0 to 70% by weight of at least one monomer selected from the group consisting of acrylonitrile, meth-acrylonitrie, acrylic ester, methacrylic ester, styrene and vinyl acetate. It is not preferable that the proportion of vinylidene chloride copolymerized is below 30% by weight, because the gas barrier properties of the shell become too low.

Preferable for another vinylidene chloride (co)polymer are copolymers that are obtained by using as polymerizable monomers (A1) 40 to 80% by weight of vinylidene chloride, (B1) 0 to 60% by weight of at least one monomer selected from the group consisting acrylonitrile and methacrylonitrile and (B2) 0 to 60% by weight of at least one monomer selected from the group consisting of acrylic ester and methacrylic ester. Such copolymers make the design of foaming temperature easy and enable high expansion ratios to be easily achievable.

Where solvent resistance and high-temperature foaming capability are desired, it is preferable that the shell is formed of a (meth)acrylonitrile (co)polymer. The (meth) acrylonitrile (co)polymer, for instance, includes copolymers that are obtained using as polymerizable monomers (meth)acrylonitrile alone or meth(acrylonitrile) and a vinyl monomer copolymerizable therewith.

The vinyl monomer copolymerizable with the (meth) acrylonitrile, for instance, includes vinylidene chloride, acrylic ester, methacrylic ester, styrene and vinyl acetate.

Preferable for such (meth)acrylonitrile (co)polymer are copolymers that are obtained using as polymerizable monomers (C) 30 to 100% by weight of at least one monomer selected from the group consisting of acrylonitrile and methacrylonitrile and (D) 0 to 70% by weight of at least one monomer selected from the group consisting of vinylidene chloride, acrylic ester, methacrylic ester, styrene and vinyl acetate. When the proportion of the (meth)acrylonitrile copolymerized is less than 30% by weight, solvent resistance and heat resistance become insufficient.

The (meth)acrylonitrile (co)polymer may be broken down into a (co)polymer that has a high (meth) acrylonitrile proportion and a high foaming temperature, and a (co)polymer that has a low (meth)acrylonitrile proportion and a low foaming temperature.

The (co)polymer having a high (meth)acrylonitrile proportion, for instance, includes a (co)polymer that is obtained using as polymerizable monomers (C) 80 to 100% by weight of at least one monomer selected from the group consisting of acrylonitrile and methacrylonitrile and (D) 0 to 20% by weight of at least one monomer selected from the group consisting of vinylidene chloride, acrylic ester, methacrylic ester, styrene and vinyl acetate.

On the other hand, the (co)polymer having a low (meth) acrylonitrile proportion, for instance, includes a copolymer that is obtained using as polymerizable monomers (C) equal or more than 30% by weight to less than 80% by weight of at least one monomer selected from the group consisting of acrylonitrile and methacrylonitrile and (D) more than 20% by weight up to 70% by weight of at least one monomer selected from the group consisting of vinylidene chloride, acrylic ester, methacrylic ester, styrene and vinyl acetate.

Also preferable for the (meth)acrylonitrile (co)polymer is a (co)polymer that is obtained using (C1) 51 to 100% by weight of at least one monomer selected from the group consisting of acrylonitrile and methacrylonitrile, (D1) 0 to 40% by weight of vinylidene chloride and (D2) 0 to 48% by weight of at least one monomer selected from the group consisting of acrylic ester and methacrylic ester.

Where a vinylidene chloride-free (co)polymer is desired for the shell polymer, preference is given to (meth)acrylonitrile (co)polymers that are obtained using as polymerizable monomers (E) 30 to 100% by weight of at least one monomer selected from the group consisting of acrylonitrile and methacrylonitrile and (F) 0 to 70% by weight of at least one monomer selected from the group consisting of acrylic ester and methacrylic ester.

Preference is also given to a copolymer that is obtained using as polymerizable monomers (E1) 1 to 99% by weight of acrylonitrile, (E2) 1 to 99% by weight of methacrylonitrile and (F) 0 to 70% by weight of at least one monomer selected from the group consisting of acrylic ester and methacrylic ester.

Where it is desired to obtain a thermally foamable microsphere that is particularly improved in terms of processability, foaming capability, gas barrier properties, solvent resistance, etc., it is preferable to use for the shell a (meth)acrylonitrile (co)polymer that is obtained using as polymerizable monomers (E1) 20 to 80% by weight of acrylonitrile, (E2) 20 to 80% by weight of methacrylonitrile and (F) 0 to 20% by weight of at least one monomer selected from the group consisting of acrylic ester and methacrylic ester.

(5) Crosslinkable Monomer

In the present invention, a crosslinkable monomer is used together with such a polymerizable monomer as mentioned above for the purpose of making improvements in foaming properties, processability, solvent resistance and heat resistance. For the crosslinkable monomer, usually, compounds having two or more carbon-carbon double bonds are used.

Exemplary crosslinkable monomers are divinylbenzene, ethylene glycol di(meth)acrylate, trimethylolpropane tri(meth)acrylate, 1,3-butyl glycol dimethacrylate and pentaerythritol tri(meth)acrylate.

The proportion of the crosslinkable monomer used is usually 0.05 to 5% by weight, and preferably 0.1 to 3% by weight on the basis of the total weight of the polymerizable monomer.

(6) Polymerization Initiator

For the polymerization initiator that is not particularly critical to the present invention, use may be made of those generally available in this field; however, it is preferable to use an oil-soluble polymerization initiator that is soluble in the polymerizable monomer. Exemplary polymerization initiators are dialkyl peroxides, diacyl peroxides, peroxy esters, peroxy-dicarbonates and azo compounds.

Usually, the polymerization initiator is contained in the monomer mixture. However, when it is required to prevent any premature polymerization, a part or the whole of the polymerization initiator may be added to an aqueous dispersion medium during or after particle formation, thereby passing it into droplets of the polymerization mixture. The polymerization initiator is usually used at a proportion of 0.0001 to 3% by weight on an aqueous dispersing medium basis.

(7) Aqueous Dispersion Medium

Usually, suspension polymerization is carried out in an aqueous dispersion medium containing a dispersion stabilizer that is exemplified by silica, magnesium hydroxide and other inorganic fine particles. Besides, co-stabilizers such as condensation products of diethanolamine and aliphatic dicarboxylic acids, polyvinyl pyrrolidone, polyethylene oxide and various emulsifiers may be used. The dispersion stabilizer is usually used at a proportion of 0.1 to 20 parts by weight per 100 parts by weight of the polymerizable monomer.

The dispersion stabilizer-containing aqueous dispersion medium is usually prepared by incorporating the dispersion stabilizer or co-stabilizer in deionized water. The pH of an aqueous phase upon polymerization is properly determined depending on the type of the dispersion stabilizer or co-stabilizer used. For instance, when silica like colloidal silica is used as the dispersion stabilizer, the polymerization is carried out in an acidic environment. To acidify the aqueous dispersion medium, an acid is added to the system if required, thereby regulating the pH of the system to 7 or lower, preferably 6 or lower, and more preferably about 3 to 4. With a dispersion stabilizer such as magnesium hydroxide or calcium phosphate that dissolves in the aqueous dispersion medium in an acidic environment, the polymerization is carried out an alkaline environment.

One preferable dispersion stabilizer combination consists of colloidal silica and a condensation product preferably exemplified by that of diethanolamine and an aliphatic dicarboxylic acid, especially that of diethanolamine and adipic acid or diethanolamine and itaconic acid. The condensation product has an acid number in the range of preferably 60 to less than 95, and more preferably 65 to 90. It is here noted that the addition of an inorganic salt such as sodium chloride or sodium sulfate to the aqueous dispersion medium makes it easy to obtain thermally foamable microspheres having more uniform particle shape. For the inorganic salt, usually, common salt is preferred.

The amount of colloidal silica used is usually in the range of 0.5 to 20 parts by weight, and preferably 1 to 15 parts by weight per 100 parts by weight of the polymerizable monomer although varying with its particle diameter. The condensation product is usually used at a proportion of 0.05 to 2 parts by weight per 100 parts by weight of the polymerizable monomer. The inorganic salt is ordinarily used at a proportion of 0 to 100 parts by weight per 100 parts by weight of the polymerizable monomer.

Other preferable dispersion stabilizer combinations include colloidal silica and water-soluble nitrogenous compounds. Among these, a colloidal silica and polyvinyl pyrrolidone combination is preferred. Combinations of magnesium hydroxide and/or calcium phosphate with emulsifiers are also preferred.

For the dispersion stabilizer, colloids of slightly water-soluble metal hydroxides (e.g., magnesium hydroxide) may be used, which hydroxides are obtained by reactions in aqueous phases of water-soluble polyvalent metal chlorides (e.g., magnesium chloride) and alkaline metal hydroxides (e.g., sodium hydroxide). For the calcium phosphate, products of reactions in aqueous phases of sodium phosphate and calcium chloride may be used.

The emulsifiers are not generally used; if desired, however, it is acceptable to use anionic surfactants such as salts of dialkyl sulfosuccinic acid or phosphoric esters of polyoxyethylene alkyl (allyl) ethers.

At least one compound selected from the group consisting of alkaline metal nitrites, stannous chloride, stannic chloride, water-soluble ascorbic acids and boric acid may be present as a polymerization aid in the aqueous dispersion medium. Suspension polymerization in the presence of these compounds causes no aggregation of polymer particles during polymerization, and prevents the polymer product from depositing onto the wall of a polymerization vessel, so that thermally foamable micro-spheres can be produced stably while heat generated due to polymerization can be effectively removed.

Among the alkaline metal nitrites, sodium nitrite and potassium nitrite are preferred in view of availability and price. The ascorbic acids, for instance, include ascorbic acid, metal salts of ascorbic acid and esters of ascorbic acid, among which water-soluble ones are preferred.

The "water-soluble ascorbic acids" are here understood to refer to those having a solubility of at least 1 g/100 cm$^3$ in water of 23° C., for which ascorbic acid and its alkaline metal salts are preferred. Among these, L-ascorbic acid (vitamin C), sodium ascorbate and potassium ascorbate are particularly preferred in view of availability and price, and action and effect as well.

These compounds are used at a proportion of usually 0.001 to 1 part by weight, and preferably 0.01 to 0.1 part by weight per 100 parts by weight of the polymerizable monomer.

(8) Suspension Polymerization

In what order the respective components are added to the aqueous dispersion medium is not critical to the present invention. Usually, however, it is preferable that the dispersion stabilizer-containing aqueous dispersion medium is prepared by adding water and the dispersion stabilizer to the aqueous dispersion medium, optionally with the addition thereto of the co-stabilizer and polymerization aid. On the other hand, the polymerizable monomer and foaming agent may be added separately to the aqueous dispersion medium whereupon they are integrated together into a polymerizable mixture (an oily mixture) in the aqueous dispersion medium. However, usually, such components are pre-mixed together and the resulting mixture is then added to the aqueous dispersion medium. The polymerization initiator may be used while previously added to the polymerizable monomer. When prevention of any premature polymerization is in need, for instance, it is acceptable to add the polymerizable monomer/foaming agent mixture to the aqueous dispersion medium and then add the polymerization initiator under agitation, thereby integrating them together in the aqueous dispersion medium. Alternatively, the polymerizable mixture may be mixed with the aqueous dispersion medium in a separate vessel. Then, the mixture is mixed under agitation in a stirring or dispersing machine with high shear force, followed by feeding in a polymerization vessel. By mixing under agitation of the polymerizable mixture with the aqueous dispersion medium, droplets of the polymerizable mixture are prepared or granulated in the aqueous dispersion medium. The average particle diameter of the droplets should preferably be substantially in agreement with the desired particle diameter of thermally foamable microspheres.

Usually, suspension polymerization is carried out at an elevated temperature of 30 to 100° C. while a reaction vessel is degassed or replaced therein by an inert gas. If the polymerizable mixture having an organosilicon compound having a polymerizable reactive group added thereto is polymerized by an ordinary suspension polymerization process, the organosilicon compound is then contained in the shell formed of the polymer. When the organosilicon compound is added to the polymerization reaction system in the course of suspension polymerization, it is preferred that the organosilicon compound be added to the polymerization reaction system usually about 1 to 12 hours, and preferably about 2 to 10 hours after the initiation of suspension polymerization. The addition of the organosilicon compound in the course of polymerization is presumed to contribute to an increase in the density of the organosilicon compound at a surface portion of the shell.

When the organosilicone compound is added to the polymerization reaction system in the course of polymerization, pH control should be performed by the addition of an acid such as hydrochloric acid for the purpose of keeping the pH of the polymerization reaction system at 7 or lower. Especially when inorganic fine particles such as colloidal silica that is insoluble in the aqueous dispersion medium at least in an acidic range is used as the dispersion stabilizer, it is preferable to keep the pH of the polymerization reaction system at 7 or lower all the way from the starting point to the stopping point of polymerization by adding the acid to the polymerization reaction system for pH control.

When the inorganic material and/or organic materials are added to the polymerization reaction system in the course of polymerization, it is again preferable to add them to the polymerization reaction system usually about 1 to 12 hours, and preferably about 2 to 10 hours after the initiation of suspension polymerization. Preferably in this case, the organosilicon compound is previously added to the polymerizable mixture or, alternatively, the organosilicon compound is added to the polymerization reaction system simultaneously with or prior to the addition of the inorganic material and/or organic materials.

After the suspension polymerization, an aqueous phase is removed by filtration, centrifugation, sedimentation, etc. After filtration and washing, the thermally foamable microspheres are dried at a temperature relatively low enough to prevent gasification of the foaming agent. If necessary, the collected thermally foamable microspheres may be treated on their surfaces with an organosilicon compound or, alternatively, the inorganic material and/or organic materials may be allowed to adhere to the surfaces of those microspheres. Moreover, the surfaces of the microspheres may be coated with various materials other than the inorganic materials.

3. Applications

The thermally foamable microspheres of the invention may find various applications while they are foamed by heating (thermally expanded) or they remain unfoamed. Taking advantage of expansibility, for instance, the thermally foamable microspheres of the invention may be used as fillers for automotive or other paints, wallpapers, foaming agents for foaming inks (for applying relief patterns to T-shirts, etc.), shrink preventives or the like.

Making good use of volume increases by foaming, the thermally foamable microspheres of the invention may also be used for the purposes of reducing the weights of plastics, paints, various materials, etc., or making them porous or imparting various functions (e.g., slip properties, heat insulation, cushioning properties, and sound insulation) to them.

The thermally foamable microspheres of the invention may have additional applications in paint, wallpaper and ink fields wherein surface properties and smoothness are required. The thermally foamable microspheres of the invention may also be suitably applied to fields where adhesion to matrix resins is needed. Moreover, the thermally foamable microspheres of the invention may be utilized in the form of functional additives comprising hollow, fine resin microspheres coated on their surfaces with the inorganic material and/or organic materials.

EXAMPLES

The present invention is now explained more specifically with reference to inventive, and comparative examples. How to measure physical properties and various properties is first given below.

Measuring Methods (1) Expansion Ratio

Thermally foamable microspheres (0.7 gram) were placed in a Geer oven wherein they were heated at a given temperature (foaming temperature) for 2 minutes for foaming. The obtained foams were placed in a graduated cylinder to measure their volume, which was then divided by the volume of the unfoamed microspheres to find an expansion ratio. In this case, the expansion ratio was measured while the foams were heated from 70° C. at an increment of 5° C. to find a foaming temperature at which the highest expansion ratio was obtained. This highest expansion ratio is herein defined as the maximum expansion ratio.

(2) Foaming Properties in Binder System

Provided was an ethylene.vinyl acetate copolymer emulsion (having a concentration of 55% by weight) containing an ethylene vinyl acetate copolymer (EVA). Then, thermally foamable microspheres were added to the emulsion at a proportion of 1 part by weight per 5 parts by weight of EVA to prepare a coating solution. This coating solution were applied on double-coated paper by means of a coater with a 200 μm gap, which paper was dried in an oven.

Drying was carried at 90° C. for 5 minutes for thermally foamable microspheres comprising a shell resin having a glass transition temperature of 100° C. or higher, and at 60° C. for 5 minutes for thermally foamable microspheres comprising a shell resin having a glass transition temperature of 70° C. to lower than 100° C.

Then, the microspheres were heated in an oven of given temperature for 2 minutes. In this case, the temperature was increased from 70° C. at an increment of 5° C. by heating. The foaming start temperature was then defined in terms of the temperature at which a large portion of particles was foamed. Moreover, a particle that was foamed even at a heating temperature lower than the foaming start temperature was defined as an abnormal foaming particle. The presence or absence of abnormal foaming particles could be checked through observation under an optical microscope of the surface of a coating film heated at a temperature lower than the foaming start temperature.

(3) Average Particle Diameter and Particle Diameter Distribution

These were measured, using a particle diameter distribution meter SALD-3000J made by Shimadzu Corporation.

Comparative Example 1

(1) Preparation of Aqueous Dispersion Medium

Six hundred (600) grams of an aqueous dispersion medium was prepared by mixing together 5.5 grams of colloidal silica, 0.825 gram of a diethanolamine-adipic acid condensation product having an acid number of 78 mgKOH/g, 0.132 gram of sodium nitrite and 594.38 grams of water. The pH of this aqueous dispersion medium was regulated to 3.2 by the addition of hydrochloric acid thereto.

(2) Preparation of Polymerizable Mixture

A polymerizable mixture was prepared by mixing together 110 grams of acrylonitrile, 110 grams of methyl methacrylate, 0.44 gram of ethylene glycol dimethacrylate, 39.6 grams of pentane and 1.32 grams of 2,2'-azobis(2,4-dimethylvaleronitrile). The monomer component consisted of, in weight %, acrylonitirle/methyl methacrylate=50/50.

(3) Preparation of Liquid Droplets

The polymerizable mixture and aqueous dispersion medium prepared as mentioned just above were stirred and mixed together in a homogenizer, thereby forming minute droplets of the polymerizable mixture in the aqueous dispersion medium.

(4) Suspension Polymerization

The aqueous dispersion medium containing a minute droplet form of polymerizable mixture was charged in a polymerization vessel (1.5 L) having a stirrer, wherein a 22-hour reaction was carried out at 53° C. on a warm water bath. After the completion of the reaction, a reaction mixture of pH 6.3 was obtained. The obtained reaction product was filtered and washed with water, and this operation was repeated a further twice, followed by drying. In this way, thermally foamable microspheres having an average particle diameter of 14 μm were collected.

The first filtrate was semitranslucent, and remained considerably cloudy even upon diluted with a hundred-fold amount of water. The second filtrate remained still whitish, and even the third filtrate was not so transparent as to be disposed as such. A flocculant was charged in the collected filtrates to settle down suspending particles, followed by centrifugation thereby separating them into solid matter and a transparent waste liquid. In view of industrial production, economically unbearable removal steps of whitish liquids are needed for prevention of environmental pollution.

(5) Thermally Foamable Microsphere

The thus obtained thermally foamable microspheres were found to have a silica content of 0.8% by weight accounting for 39% by weight of the silica feed. Upon foaming of the thermally foamable microspheres, striking fusion among foamed particles was found. The rate of expansion was 40 at a foaming temperature of 145° C. As a result of examination of a foaming behavior in a binder system, a considerable number of particles (abnormal foaming particles) were observed even at heating temperatures lower than the temperature (140° C.) at which a large number of particles were foamed. In other words, very broad foaming start behavior was observed. If thermally foamable microspheres having such foaming start behavior are used in the fields of paints, wallpapers and inks where surface properties and smoothness are needed, the surface properties and smoothness will be damaged, causing performance problems on practical use.

Example 1

In the suspension polymerization step (4) of Comparative Example 1, 0.2 gram of 3-methacryloxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 1 with the exception of the addition of the silane coupling agent and hydrochloric acid in the suspension polymerization step (4) of Comparative Example 1.

After the completion of the reaction, the pH of the reaction mixture was 4.5. This reaction mixture was filtered and washed with water, and this operation was repeated a further twice, followed by drying. In this way, thermally foamable microspheres were collected. The first filtrate was transparent and free from any whitish matter. For disposal, only pH control was needed.

The thus obtained thermally foamable microspheres had a silica content of 2.0% by weight, and by calculation, it was found that nearly all of the charged silica was contained in the thermally foamable microspheres. Upon foaming of the thermally foamable microspheres, there was little or no fusion among foamed particles, with no noticeable agglomeration. The rate of expansion was 40 at a foaming temperature of 145° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

Example 2

In the polymerizable mixture preparation step (2) of Comparative Example 1, 0.2 gram of 3-methacryloxypropyl-trimethoxysilane that was a silane coupling agent having a polymerizable reactive group was used to prepare a silane coupling agent-containing polymerizable mixture. In the next liquid droplet preparation step (3), hydrochloric acid was added to the aqueous dispersion medium and polymerizable mixture to regulate the pH of the polymerization system to 3.0 prior to stirring and mixing in a homogenizer, thereby making a minute droplet form of polymerizable mixture. Otherwise, thermally foamable microspheres were prepared as in Comparative Example 1.

After the completion of the reaction, the pH of the reaction mixture was 5.5. The reaction mixture contained a slight amount of agglomerates, which were removed through a 200-mesh sieve. Thereafter, the reaction mixture was filtered and washed with water, and this operation was repeated a further twice, followed by drying. In this way, thermally foamable microspheres having an average particle diameter of 14 μm were collected. The first filtrate remained only slightly whitish; however, there was no whitish matter in the second and third filtrates.

The thus obtained thermally foamable microspheres had a silica content of 2.0% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 40 at a foaming temperature of 145° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

Example 3

Thermally foamable microspheres were prepared as in Example 1 with the exception that no pH control by the addition of hydrochloric acid into the polymerizer 7 hours after the initiation of polymerization was carried out. After the completion of the reaction, the pH of the reaction mixture was 5.8. The reaction mixture was filtered and washed with water, and this operation was repeated a further twice, followed by drying. In this way, thermally foamable microspheres having an average particle diameter of 14 μm were collected. The first filtrate remained only slightly whitish; however, there was no whitish matter in the second and third filtrates.

The thus obtained thermally foamable microspheres had a silica content of 2.0% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 40 at a foaming temperature of 145° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

Example 4

In the suspension polymerization step (4) of Comparative Example 1, 0.2 gram of 3-glycidoxypropyl-trimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 1 with the exception of the addition of the silane coupling agent and hydrochloric acid in the suspension polymerization step (4) of Comparative Example 1.

After the completion of the reaction, the pH of the reaction mixture was 4.5. This reaction mixture was filtered and washed with water, and this operation was repeated a further twice, followed by drying. In this way, thermally foamable microspheres were collected. The first filtrate was transparent and free from any whitish matter. For disposal, only pH control was needed.

The thus obtained thermally foamable microspheres had a silica content of 2.0% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 40 at a foaming temperature of 145° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

Example 5

In the suspension polymerization step (4) of Comparative Example 1, 0.6 gram of 3-methacryloxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 1 with the exception of the addition of the silane coupling agent and hydrochloric acid in the suspension polymerization step (4) of Comparative Example 1.

After the completion of the reaction, the pH of the reaction mixture was 4.2. This reaction mixture was filtered and washed with water, and this operation was repeated a further twice, followed by drying. In this way, thermally foamable microspheres were collected. The first filtrate was transparent and free from any whitish matter. For disposal, only pH control was needed. The thus obtained thermally foamable microspheres had a silica content of 2.0% by weight, and by calculation, it was found that nearly all of the silica feed was contained in the thermally foamable microspheres.

Upon foaming of the thermally foamable microspheres, there was little or no fusion among foamed particles, with no noticeable agglomeration. The rate of expansion was 42 at a foaming temperature of 145° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

It was further found that the thermally foamable microspheres showing such sharp foaming start behavior, when used in the fields of paints, wallpapers and inks where surface properties and smoothness were needed, ensured very excellent surface properties and smoothness.

Comparative Example 2

(1) Preparation of Aqueous Dispersion Medium

Six hundred (600) grams of an aqueous dispersion medium was prepared by mixing together 4 grams of colloidal silica, 0.5 gram of a diethanolamine-adipic acid condensation product having an acid number of 78 mgKOH/g, 0.12 gram of sodium nitrite and 595.38 grams of water. The pH of this aqueous dispersion medium was regulated to 3.2 by the addition of hydrochloric acid thereto.

(2) Preparation of Polymerizable Mixture

A polymerizable mixture was prepared by mixing together 120 grams of acrylonitrile, 60 grams of methyl methacrylate, 20 grams of methyl acrylate, 0.4 gram of ethylene glycol dimethacrylate, 22 grams of isopentane and 1.2 grams of 2,2'-azobis(2,4-dimethylvaleronitrile). The monomer component consisted of, in weight %, acrylonitirle/methyl methacrylate/methyl acrylate=60/30/10.

(3) Preparation of Liquid Droplets

The polymerizable mixture and aqueous dispersion medium prepared as mentioned just above were stirred and mixed together in a homogenizer, thereby forming minute droplets of the polymerizable mixture in the aqueous dispersion medium.

(4) Suspension Polymerization

The aqueous dispersion medium containing a minute droplet form of polymerizable mixture was charged in a polymerization vessel (1.5 L) having a stirrer, wherein a 22-hour reaction was carried out at 53° C. on a warm water bath. After the completion of the reaction, a reaction mixture of pH 5.9 was obtained. The obtained reaction product was filtered and washed with water, and this operation was repeated a further twice, followed by drying. In this way, thermally foamable microspheres having an average particle diameter of 16 μm were collected.

The first filtrate was semitranslucent, and remained considerably whitish even upon diluted with a hundred-fold amount of water. The second filtrate remained still whitish, and even the third filtrate was not so transparent as to be disposed as such. A flocculant was charged in the collected filtrates to settle down suspending particles, followed by centrifugation thereby separating them into solid matter and a transparent waste liquid.

(5) Thermally Foamable Microsphere

The thus obtained thermally foamable microspheres were found to have a silica content of 0.6% by weight accounting for 34% by weight of the silica feed. Upon foaming of the thermally foamable microspheres, striking fusion among foamed particles was found. The rate of expansion was 46 at a foaming temperature of 140° C. As a result of examination of foaming behavior in a binder system, a considerable number of particles (abnormal foaming particles) were observed even at heating temperatures lower than the temperature (135° C.) at which a large number of particles were foamed. In other words, very broad foaming start behavior was observed. If thermally foamable microspheres having such foaming start behavior are used in the fields of paints, wallpapers and inks where surface properties and smoothness are needed, the surface properties and smoothness will degrade, causing performance problems on practical use.

Example 6

In the suspension polymerization step (4) of Comparative Example 2, 0.1 gram of 3-methacryloxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 2 with the exception of the addition of the silane coupling agent and hydrochloric acid in the suspension polymerization step (4) of Comparative Example 2.

After the completion of the reaction, the pH of the reaction mixture was 4.2. This reaction mixture was filtered and washed with water, and this operation was repeated a further twice, followed by drying. In this way, thermally foamable microspheres having an average particle diameter of 17 µm were collected. The first filtrate was transparent and free from any whitish matter. For disposal, only pH control was needed.

The thus obtained thermally foamable microspheres had a silica content of 1.7% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 50 at a foaming temperature of 140° C. As a result of examination of foaming behavior in a binder system, it was found that there was little or no abnormal foaming particle that was foamed even at heating temperatures lower than the temperature (135° C.) at which a large number of particles were foamed; the thermally foamable microspheres exhibited sharp foaming start behavior.

Example 7

In the polymerizable mixture preparation step (2) of Comparative Example 2, 0.1 gram of 3-methacryloxypropyl-trimethoxysilane that was a silane coupling agent having a polymerizable reactive group was added to the polymerizable mixture to prepare a silane coupling agent-containing polymerizable mixture. In the next liquid droplet preparation step (3), hydrochloric acid was added to the aqueous dispersion medium and polymerizable mixture to regulate the pH of the polymerization reaction system to 3.0 prior to stirring and mixing in a homogenizer, thereby making a minute droplet form of polymerizable mixture. Otherwise, thermally foamable microspheres were prepared as in Comparative Example 2.

After the completion of the reaction, the pH of the reaction mixture was 5.5. The reaction mixture contained a slight amount of agglomerates, which were removed through a 100-mesh sieve. Thereafter, the reaction mixture was filtered and washed with water, and this operation was repeated a further twice, followed by drying. In this way, thermally foamable microspheres having an average particle diameter of 16 µm were collected. The first filtrate remained only slightly whitish; however, there was no whitish matter in the second and third filtrates.

The thus obtained thermally foamable microspheres had a silica content of 1.7% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 47 at a foaming temperature of 140° C. As a result of examination of foaming behavior in a binder system, it was found that there was little or no abnormal foaming particle that was foamed even at heating temperatures lower than the temperature (135° C.) at which a large number of particles were foamed; the thermally foamable microspheres exhibited sharp foaming start behavior.

Example 8

In the suspension polymerization step (4) of Comparative Example 2, 0.5 gram of 3-glycidoxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 2 with the exception of the addition of the silane coupling agent and hydrochloric acid in the suspension polymerization step (4) of Comparative Example 2.

After the completion of the reaction, the pH of the reaction mixture was 4.0. This reaction mixture was filtered and washed with water, and this operation was repeated a further twice, followed by drying. In this way, thermally foamable microspheres having an average particle diameter of 17 µm were collected. The first filtrate was transparent and free from any whitish matter. For disposal, only pH control was needed.

The thus obtained thermally foamable microspheres had a silica content of 1.7% by weight, and by calculation, it was found that nearly all of the silica feed was contained in the thermally foamable microspheres. Upon foaming of the thermally foamable microspheres, there was little or no fusion among foamed particles, with no noticeable agglomeration. The rate of expansion was 50 at a foaming temperature of 140° C. As a result of examination of foaming behavior in a binder system, it was found that there was little or no abnormal foaming particle that was foamed even at heating temperatures lower than the temperature (135° C.) at which a large number of particles were foamed; the thermally foamable microspheres exhibited sharp foaming start behavior.

It was further found that the thermally foamable microspheres showing such sharp foaming start behavior, when used in the fields of paints, wallpapers and inks where surface properties and smoothness were required, ensured very excellent surface properties and smoothness.

Comparative Example 3

(1) Preparation of Aqueous Dispersion Medium

Five hundred and fifty-seven (557) grams of an aqueous dispersion medium was prepared by mixing together 16.5 grams of colloidal silica, 1.65 grams of a diethanolamine-adipic acid condensation product having an acid number of 78 mgKOH/g, 169.8 grams of common salt, 0.11 gram of sodium nitrite and 368.94 grams of water. The pH of this aqueous dispersion medium was regulated to 3.2 by the addition of hydrochloric acid thereto.

(2) Preparation of Polymerizable Mixture

A polymerizable mixture was prepared by mixing together 147.4 grams of acrylonitrile, 68.2 grams of methacrylonitrile, 4.4 grams of methyl acrylate, 0.66 gram of trimethylolpropane trimethacrylate, 26.2 grams of n-pentane, 15 grams of petroleum ether and 1.2 grams of 2,2'-azoisobutyronitrile. The monomer component consisted of, in weight %, acrylonitirle/methacrylonitrile/methyl methacrylate=67/31/2.

(3) Preparation of Liquid Droplets

The polymerizable mixture and aqueous dispersion medium prepared as mentioned just above were stirred and mixed together in a homogenizer, thereby forming minute droplets of the polymerizable mixture in the aqueous dispersion medium.

(4) Suspension Polymerization

The aqueous dispersion medium containing a minute droplet form of polymerizable mixture was charged in a polymerization vessel (1.5 L) having a stirrer, wherein a 20-hour reaction was carried out at 60° C. on a warm water bath. The obtained reaction product was filtered and washed with water, and this operation was repeated a further several times, followed by drying. In this way, thermally foamable microspheres having an average particle diameter of 28 µm were collected.

(5) Thermally Foamable Microsphere

The thus obtained thermally foamable microspheres were found to have a silica content of 5.5% by weight. A 5% aqueous slurry of the thermally foamable microspheres was stirred in a stirrer for 60 minutes, whereupon the slurry became whitish due to silica released from the thermally foamable microspheres. The amount of silica contained in the thermally foamable microspheres recovered later from the slurry decreased to 1.3% by weight. Upon foaming of the thermally foamable microspheres, striking fusion among foamed particles was found.

The rate of expansion was 55 at a foaming temperature of 170° C. As a result of examination of foaming behavior in a binder system, a considerable number of abnormal foaming particles were observed even at heating temperatures lower than the temperature (140° C.) at which a large number of particles were foamed. In other words, very broad foaming start behavior was observed. If thermally foamable microspheres having such foaming start behavior are used in the fields of paints, wallpapers and inks where surface properties and smoothness are needed, the surface properties and smoothness will degrade, causing performance problems on practical use.

Example 9

In the suspension polymerization step (4) of Comparative Example 3, 0.2 gram of 3-methacryloxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 3 with the exception of the addition of the silane coupling agent and hydrochloric acid in the suspension polymerization step (4) of Comparative Example 3. After the completion of the reaction, the pH of the reaction mixture was 4.2. This reaction mixture was filtered and washed with water, and this operation was repeated a further several times, followed by drying. In this way, thermally foamable microspheres having an average particle diameter of 28 µm were collected.

The thus obtained thermally foamable microspheres were found to have a silica content of 5.5% by weight. A 5% aqueous slurry of the thermally foamable microspheres was stirred in a stirrer for 60 minutes. As a result, the slurry contained little or no whitish matter. The amount of silica contained in the thermally foamable microspheres recovered later from the slurry was 5.4% by weight substantially on the same level as before stirring.

Upon foaming of the thermally foamable microspheres, there was no fusion among foamed particles. The rate of expansion was 55 at a foaming temperature of 170° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

It was further found that the thermally foamable microspheres showing such sharp foaming start behavior, when used in the fields of paints, wallpapers and inks where surface properties and smoothness were required, ensured very excellent surface properties and smoothness.

Example 10

In the suspension polymerization step (4) of Comparative Example 3, 0.3 gram of 3-methacryloxy-propyltrimethoxysilane that was a silane coupling agent having a polymerizable reactive group and 5.5 grams of silica colloid were added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 3 with the exception of the concurrent addition of the silane coupling agent and silica colloid and the addition of hydrochloric acid in the suspension polymerization step (4) of Comparative Example 3. After the completion of the reaction, the pH of the reaction mixture was 4.2. This reaction mixture was filtered and washed with water, and this operation was repeated a further several times, followed by drying. In this way, thermally foamable microspheres having an average particle diameter of 28 μm were collected.

The thus obtained thermally foamable microspheres were found to have a silica content of 7.7% by weight. A 5% aqueous slurry of the thermally foamable microspheres was stirred in a stirrer for 60 minutes. As a result, the slurry became only slightly whitish. The amount of silica contained in the thermally foamable microspheres recovered later from the slurry was 7.4% by weight substantially on the same level as before stirring.

Upon foaming of the thermally foamable microspheres, there was no fusion among foamed particles. The rate of expansion was 55 at a foaming temperature of 170° C. As a result of examination of foaming behavior in a binder system, it was found that there was little or no abnormal foaming particle that was foamed even at heating temperatures lower than the temperature (140° C.) at which a large number of particles were foamed; the thermally foamable microspheres exhibited sharp foaming start behavior.

It was further found that the thermally foamable microspheres showing such sharp foaming start behavior, when used in the fields of paints, wallpapers and inks where surface properties and smoothness were required, ensured very excellent surface properties and smoothness.

Comparative Example 4

In the suspension polymerization step (4) of Comparative Example 3, 5.5 grams of silica colloid were added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 3 with the exception of the further addition of silica colloid and the addition of hydrochloric acid in the suspension polymerization step (4) of Comparative Example 3. After the completion of the reaction, the pH of the reaction mixture was 4.5. This reaction mixture was filtered and washed with water, and this operation was repeated a further several times, followed by drying. In this way, thermally foamable microspheres having an average particle diameter of 27 μm were collected.

The first filtrate was semitranslucent, and remained considerably whitish even upon diluted with a hundred-fold amount of water. The second filtrate remained still whitish, and even the third filtrate was not so transparent as to be disposed as such.

The thus obtained thermally foamable microspheres were found to have a silica content of 5.8% by weight nearly comparable to that of Comparative Example 3. It was found that even by a further addition of silica colloid after the initiation of polymerization, the silica colloid did not adhere to the thermally foamable microspheres.

A 5% aqueous slurry of the thermally foamable microspheres was stirred in a stirrer for 60 minutes. As a result, the slurry became only slightly whitish. The amount of silica contained in the thermally foamable microspheres recovered later from the slurry decreased to 1.4% by weight.

Upon foaming of the thermally foamable microspheres, striking fusion among foamed particles was found. The rate of expansion was 55 at a foaming temperature of 170° C. As a result of examination of a foaming behavior in a binder system, a considerable number of particles abnormal foaming particles were observed even at heating temperatures lower than the temperature (140° C.) at which a large number of particles were foamed. In other words, very broad foaming start behavior was observed.

It was further found that the thermally foamable microspheres having such broad foaming start behavior, when used in the fields of paints, wallpapers and inks where surface properties and smoothness were required, the surface properties and smoothness was damaged, causing problems on practical use.

Comparative Example 5

Thermally foamable microspheres were produced as in Comparative Example 3 with the exception that a further 5.5 grams of colloidal silica were used at the starting point of polymerization after the emulsified liquid droplet preparation in Comparative Example 3. The thus obtained thermally foamable microspheres had a small average particle diameter of 20 μm, with the rate of expansion at a foaming temperature of 170° C. going down to 40. In other words, it was impossible to increase the amount of colloidal silica only while the average particle diameter was maintained.

Comparative Example 6

(1) Preparation of Aqueous Medium Dispersion

Twenty-two (22) grams of colloidal silica having a solid matter of 40% by weight were added to and dissolved in 770 grams of deionized water. Further, 0.8 gram of a diethanol amine-adipic acid condensation product and 0.13 gram of sodium nitride were dissolved in the solution with the addition thereto of hydrochloric acid, thereby preparing an aqueous dispersion medium of pH 3.5.

(2) Preparation of Polymerizable Mixture

A polymerizable mixture was prepared by mixing together 123.2 grams of vinylidene chloride, 85.8 grams of acrylonitrile, 11 grams of methyl methacrylate, 0.33 gram of trimethylolpropane trimethacrylate, 1.1 grams of 2,2'-azobisdimethylvaleronitrile and 35.2 grams of butane. The monomer component consisted of, in weight %, vinylidene chloride/acrylonitirle/methyl methacrylate=56/39/5.

(3) Preparation of Liquid Droplets

The polymerizable mixture and aqueous dispersion medium prepared as mentioned just above were stirred and mixed together in a homogenizer, thereby forming minute droplets of the polymerizable mixture in the aqueous dispersion medium.

(4) Suspension Polymerization

The aqueous dispersion medium containing a minute droplet form of polymerizable mixture was charged in a polymerization vessel (1.5 L) having a stirrer, wherein a 22-hour reaction was carried out at 50° C. on a warm water bath. After the completion of the reaction, the obtained reaction mixture was filtered and washed with water, and this operation was repeated a further several times, followed by drying. In this way, thermally foamable microspheres having an average particle diameter of 14 μm were collected.

(5) Thermally Foamable Microsphere

The thus obtained thermally foamable microspheres were found to have a silica content of 3.3% by weight. A 5% aqueous slurry of the thermally foamable microspheres was stirred in a stirrer for 60 minutes, whereupon the slurry became whitish due to silica released from the thermally foamable microspheres. The amount of silica contained in the thermally foamable microspheres recovered later from the slurry decreased to 2.4% by weight.

Upon foaming of the thermally foamable microspheres, striking fusion among foamed particles was found. The rate of expansion was 50 at a foaming temperature of 130° C. As a result of examination of foaming behavior in a binder system, a considerable number of abnormal foaming particles were observed even at heating temperatures lower than the temperature (80° C.) at which a large number of particles were foamed. In other words, very broad foaming start behavior was observed.

It was found that the thermally foamable microspheres having such broad foaming start behavior, when used in the fields of paints, wallpapers and inks where surface properties and smoothness were required, the surface properties and smoothness was damaged, causing problems on practical use.

Example 11

In the suspension polymerization step (4) of Comparative Example 6, 0.2 gram of 3-methacryloxy-propyltrimethoxysilane that was a silane coupling agent having a polymerizable reactive group was added into a polymerizer (polymerization reaction system) 6 hours after the initiation of polymerization. Further, 7 hours after the initiation of polymerization, hydrochloric acid was added into the polymerizer to regulate the pH of the polymerization reaction system to 3.0. Thus, thermally foamable microspheres were produced as in Comparative Example 6 with the exception of the addition of the silane coupling agent and hydrochloric acid in the suspension polymerization step (4) of Comparative Example 6. After the completion of the reaction, the pH of the reaction mixture was 3.5. This reaction mixture was filtered and washed with water, and this operation was repeated a further several times, followed by drying. In this way, thermally foamable microspheres having an average particle diameter of 14 μm were collected.

The thus obtained thermally foamable microspheres were found to have a silica content of 3.3% by weight. A 5% aqueous slurry of the thermally foamable microspheres was stirred in a stirrer for 60 minutes. As a result, there was little or no whitish matter in the slurry. The amount of silica contained in the thermally foamable microspheres recovered later from the slurry was 3.2% by weight substantially on the same level as before stirring. Upon foaming of the thermally foamable microspheres, there was no fusion among foamed particles.

The rate of expansion was 50 at a foaming temperature of 130° C. As a result of examination of foaming behavior in a binder system, it was found that there was little or no abnormal foaming particle that was foamed even at heating temperatures lower than the temperature (80° C.) at which a large number of particles were foamed; the thermally foamable microspheres exhibited sharp foaming start behavior.

It was further found that the thermally foamable microspheres showing such sharp foaming start behavior, when used in the fields of paints, wallpapers and inks where surface properties and smoothness were required, ensured very excellent surface properties and smoothness.

INDUSTRIAL APPLICABILITY

The present invention provides a thermally foamable microsphere having improved adhesion to other material and a process for the production of the same. The present invention also provides a thermally foamable microsphere with reduced fusion among foamed particles and a process for producing the same. Further, the present invention provides a thermally foamable microsphere that exhibits sharp foaming behavior even upon subject to thermal hysteresis at high temperatures on drying, etc. and a process for producing the same.

Furthermore, the present invention provides a thermally foamable microsphere that can adhere at its surface firmly to other material so that hybrid hollow microspheres, functional additives, etc, can be prepared, and a process for producing the same. According to the present production process, clouding problems with waste liquids ascribable to inorganic fine particles used as dispersion stabilizers can be reduced or eliminated. Thus, the present production process is environmentally friendly. The thermally foamable microspheres of the present invention may find applications in a wide range of art fields as additives for various materials inclusive of plastics, paints and inks.

The invention claimed is:

1. A thermally foamable microsphere having an average particle diameter of 3 to 100 μm, comprising (i) a shell formed of a polymer which is a copolymer of a polymerizable monomer and an organosilicon compound, (ii) a foaming agent wrapped up and encapsulated in the shell formed of the polymer, and (iii) inorganic fine particles having an average particle diameter of up to 1 μm adhered uniformly and firmly to a surface of the shell via the organosilicon compound, wherein the shell formed of the polymer is formed by suspension polymerization of a polymerizable mixture containing at least the foaming agent and the polymerizable monomer in the presence of the organosilicon compound in an aqueous dispersion medium containing a dispersion stabilizer comprising the inorganic fine particles in an amount of 0.1 to 20 parts by weight per 100 parts by weight of the polymerizable monomer in an acidic environment, wherein a) the foaming agent is a low-boiling organic solvent that gasifies at a temperature lower than a softening point of the shell-forming polymer,
   b) the polymerizable monomer is selected from the group consisting of (i) a mixture of vinylidene chloride and at least one vinyl monomer copolymerizable with vinylidene chloride and selected from the group consisting of acrylonitrile, methacrylonitrile, acrylic ester, methacrylic ester, styrene and vinyl acetate, and (ii) a mixture of (meth)acrylonitrile and at least one a vinyl monomer copolymerizable with (meth)acrylonitrile and selected from the group consisting of vinylidene chloride, acrylic ester, methacrylic ester, styrene and vinyl acetate,
   c) the organosilicon compound is a silane coupling agent represented by the following formula (1)

$$YSi(CH_3)_{3-n}X_n \qquad (1),$$

in which
   n is 1, 2 or 3;
   Y stands for an organic functional group selected from the group consisting of a vinyl group, a methacryl group, an acryl group, and an allyl group; and X stands for —OR or —NR, wherein R is a hydrogen atom or a lower alkyl group,
   d) the organosilicon compound is contained in an amount of 0.015 to 1% by weight on the basis of a total weight of said thermally foamable microsphere, and
   e) the inorganic fine particles are colloidal silica particles.

2. The thermally foamable microsphere according to claim 1, wherein said shell-forming polymer comprises a vinylidene chloride copolymer.

3. The thermally foamable microsphere according to claim 1, wherein the foaming agent comprises isobutane, n-butane, n-pentane, isopentane, n-hexane, isohexane, heptane, 2,2,4-trimethylpentane, petroleum ether, or a mixture of two or more thereof.

4. The thermally foamable microsphere according to claim 1, wherein said shell-forming polymer comprises a (meth) acrylonitrile copolymer.

5. The thermally foamable microsphere according to claim 1, wherein said microsphere has an average particle diameter of 5 to 50 μm.

* * * * *

UNITED STATES PATENT AND TRADEMARK OFFICE
CERTIFICATE OF CORRECTION

PATENT NO.        : 7,931,967 B2
APPLICATION NO.   : 10/480207
DATED             : April 26, 2011
INVENTOR(S)       : Yasuhiro Tasaki, Genzo Asai and Yoshikatsu Satake It is certified that error appears in the above-identified patent and that said Letters Patent is hereby corrected as shown below:

Claim 1, column 26, line 48, change "a vinyl" to --vinyl--

Signed and Sealed this
Twenty-fifth Day of October, 2011

David J. Kappos
*Director of the United States Patent and Trademark Office*